United States Patent [19]
Sakaguchi et al.

[11] Patent Number: 4,817,884
[45] Date of Patent: Apr. 4, 1989

[54] METHOD AND DEVICE FOR WINDING MAGNETIC TAPE USING MAGNETIC ALIGNMENT

[75] Inventors: Masaaki Sakaguchi; Mitsunobu Usui; Akira Takagi, all of Kangawa, Japan

[73] Assignee: Fuji Photo Film Co., Ltd., Kanagawa, Japan

[21] Appl. No.: 8,494

[22] Filed: Jan. 29, 1987

[30] Foreign Application Priority Data

Jan. 30, 1986 [JP] Japan .................. 61-16887
Apr. 18, 1986 [JP] Japan .............. 61-57581[U]

[51] Int. Cl.$^4$ ................ B65H 18/26; G11B 15/30
[52] U.S. Cl. .................. 242/67.1 R; 242/76; 226/93
[58] Field of Search ............ 242/67.1 R, 76, 78, 242/78.1, 179, 186; 226/93–97; 360/66

[56] References Cited

U.S. PATENT DOCUMENTS 4,313,441 8/1982 Graham ................ 242/68.1

FOREIGN PATENT DOCUMENTS

51-64286 3/1986 Japan .

Primary Examiner—Stuart S. Levy
Assistant Examiner—Steven M. DuBois
Attorney, Agent, or Firm—Sughrue, Mion, Zinn, Macpeak & Seas

[57] ABSTRACT

A tape winding device in which a tape is wound onto a reel. A magnetic field is applied to the tape during winding in a direction oblique to the axis of rotation and thus to the tape thickness whereby the tape is evened up to the flange of the reel.

9 Claims, 6 Drawing Sheets

METHOD AND DEVICE FOR WINDING MAGNETIC TAPE USING MAGNETIC ALIGNMENT

BACKGROUND OF THE INVENTION

1. Field of the Invention

The present invention relates to a method and a device for winding a magnetic tape, such as winding a magnetic tape of prescribed length from a source roll of a magnetic tape to a small tape winding body, rewinding a magnetic tape from a tape winding body to another tape winding body, winding a magnetic tape of large width for a source "roll", and winding a magnetic tape of large width to a plurality of tape winding bodies while slitting the tape.

2. Background of the Invention

A process of manufacturing a magnetic tape such as an audio cassette tape, a video cassette tape, a memory tape and a broadcasting video tape includes a step of winding a magnetic tape of prescribed length from a source roll of a large-length tape to a small tape winding body such as a reel and a hub, a step of rewinding a magnetic tape from a tape winding body to another tape winding body, a step of winding a magnetic tape of large width as a source tape, a step of winding a magnetic tape slit from another magnetic tape, and so forth. When the magnetic tape is wound on the tape winding body in the process of the winding or the rewinding, the tape may vibrate in the direction of the thickness of the tape and this vibration can fluctuate due to the physical properties of the magnetic tape and those of the tape winding body so that each side edge of the tape wound on the winding body is unneatly overlaid on itself. The higher that the speed of the winding is, the more unneatly the side edge is overlaid on itself.

A magnetic tape whose side edge is unneatly overlaid on itself as described above has problems that the external appearance of the wound tape housed as a commercial product in a magnetic tape cassette is bad. Furthermore, the side edge is likely to be damaged to result in various troubles such as the deterioration of the electromagnetic converting properties of the tape. The unneat overlaying is a serious drawback, particularly for a magnetic video tape for high-density recording, because an audio signal or a tuning signal is recorded near the side edge of the tape. For these reasons, in a conventional process of manufacturing a magnetic tape, the wound states of all magnetic tapes are visually inspected or the like after a winding process or a rewinding process. Since the inspection takes much time and money, the inspection is a major disadvantage in the magnetic tape manufacturing process.

Figure 1:
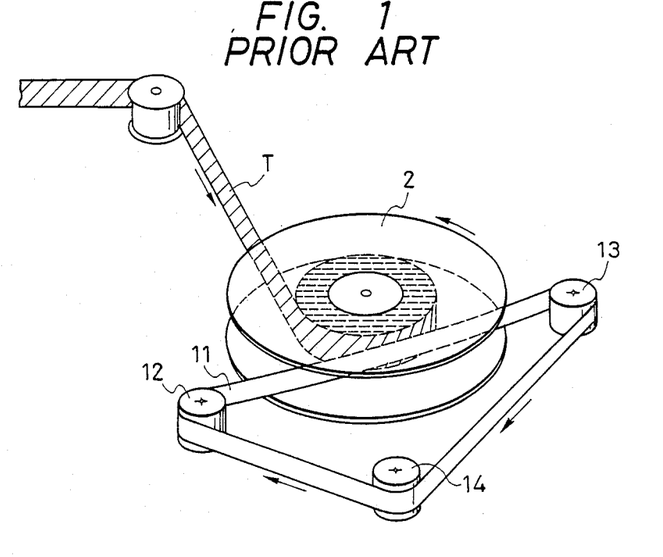
FIGS. 1 and 2 show perspective schematic views of portions of a conventional winding devices.
Figure 2:
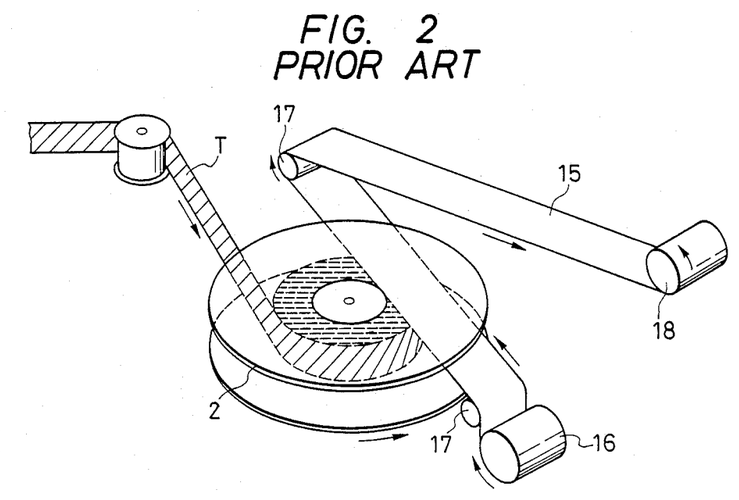

Conventional systems, which are shown in FIGS. 1 and 2 and which accomplish what is called neat winding, have been adopted to wind a magnetic tape of low neat-winding yield in order to improve the wound state of the tape to reduce the necessity of its inspection. FIGS. 1 and 2 show perspective schematic views of tape winding bodies 2 and the vicinity thereof.

In the conventional system shown in FIG. 1, an endless flexible belt 11 made of rubber, polyimide or the like and rotatably supported by rollers 12, 13 and 14 is revolved together with the magnetic tape T and elastically pushes the magnetic side of the tape under relatively high pressure in the radial direction of the tape winding body 2 to neatly wind the tape.

In the conventional system shown in FIG. 2, a belt 15 made of a relatively soft nonwoven fabric or the like is provided between one flange of the tape winding body 2 and one side edge of the magnetic tape T to push the side edge of the tape T under relatively high pressure while the belt is supported by a roller 17 or the like and wound at a low constant speed from a belt send-out member 16 to a belt winding member 18 so as to neatly wind the tape.

However, since the belts 11 and 15 are placed in direct contact with the magnetic tape T in the above-mentioned systems, there are various problems that the magnetic layer of the tape is worn or the fibers of the nonwoven fabric come off to locally hinder recording on the tape, inappropriate pressure acts to deform the tape or damage its side edge, and so forth. For that reason, the systems do not function properly. In addition, since the wear and tear of the neat winding systems are large, they have disadvantages with regard to their cost and maintenance as well. The constitution of each of the systems needs to be such that the tape winding body 2 is moved between at least a working position and a nonworking position when it is replaced. The constitution makes a magnetic tape winding device complicated and renders it relatively time-consuming to replace the tape winding body 2. The period of time required for the movement of the tape winding body 2 hinders the enhancement of productivity.

Two systems for winding a magnetic tape for a cassette are used today. One of them is an open winding system in which the tape is neatly wound and then inserted into the cassette as so to be a finished product. The other is an in-cassette winding system which is also called C-O winding system or V-O winding system and in which the tape is wound at the final stage of assembly of the cassette.

Figure 3:
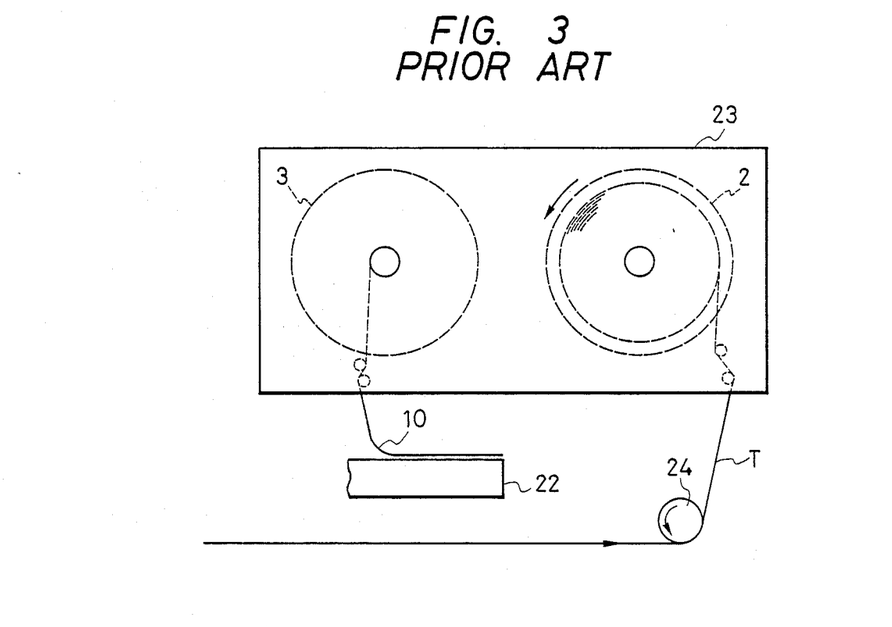
FIG. 3 shows a schematic plan view of a conventional winding device employed in an in-cassette winding method.
Figure 4:
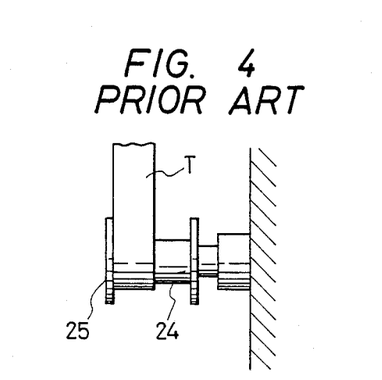
FIG. 4 shows an enlarged side view of the main part of the device shown in FIG. 3.

As for the in-cassette winding system, as shown in FIG. 3, the cassette 23 without the magnetic tape is first assembled, an outgoing tape winding body 2 and an incoming tape winding body 3 which are coupled to each other by a leading tape 10 are inserted into the cassette 23 and screws are tightened so as to provide an unfinished product generally called V-O, C-O or the like. In the unfinished product, the leading tape 10 is partly pulled out by an in-cassette winder and cut in half. The front end of the magnetic tape T is spliced to one cut-off end of the leading tape 10 whose other cut-off end is held by a suction member 22. The tape winding body 2 having the leading tape spliced to the magnetic tape is rotated to wind the magnetic tape on the body 2 by a prescribed length. The magnetic tape T is then cut off. The rear end of the magnetic tape T wound on the winding body 2 is then spliced to the other cut-off end of the leading tape 10, thus finishing the product. Since the wound state of the magnetic tape T entirely depends on the physical properties of the tape T and the accuracy of the assembly of the cassette 23, the wound state cannot be well controlled. For that reason, the yield of well-wound magnetic tapes is low. In order to increase the yield, a roller 24, shown in FIG. 4, having an upper and a lower flanges 25 has been provided on a trial basis to apply a force to the magnetic tape in the direction of its width to push the tape T sideward. However, if the force is strong, the side edge of the tape is more likely to be damaged. If the force is weak, it hardly serves to neatly wind the tape. All in all, no effective means have been available to improve the wound state of the tape.

Figure 5:
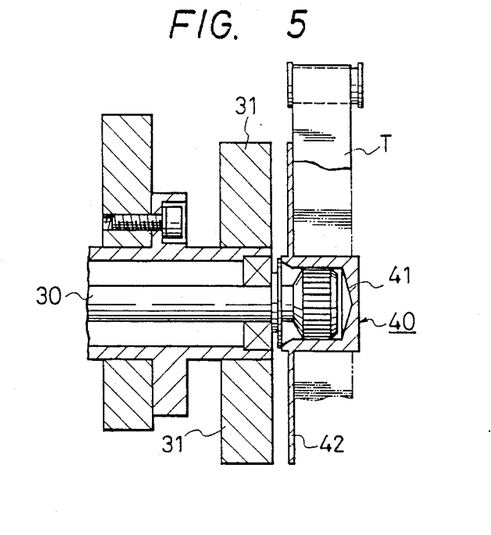
FIG. 5 shows a schematic sectional view of a part of another winding device.

Meanwhile, a magnetic tape winding device was recently proposed in the Japanese Patent Application (OPI) No. 51642/86 (the term "OPI" as used herein means an "unexamined published application"). In the device illustrated in FIG. 5, a winding drive shaft 30 is removably coupled to the winding hub 41 of a winding reel 42 comprising the hub and a flange 42. At least one magnet 31 is provided to face the wound side edge of a magnetic tape across the flange 42 while the tape is wound on the reel 40 so as to improve the wound state of the tape. However, the magnet 31 provided around the shaft 30 has a problem that the wound state of the tape is worse at its central portion near the winding hub 41 than at the peripheral portion of the tape. That is because the form of the magnet 31 is limited by the shaft 30. The magnet 31 is made annular so that the directions of the lines of magnetic force thereof are nonuniformly distributed near the central portion of the winding reel 40 due to the hollow central portion of the magnet. The magnetic flux density near the center of the reel 40 is so low that the magnetic force which pulls the magnetic tape T toward the flange 42 is unstable and weak at the initial stage of the winding of the tape. There has been disclosed in Japanese Patent Application (OPI) No. 16886/86, and Japanese Utility Model Applications Nos. 48899/86 and 48900/86, combined into U.S. patent application Ser. No. 8,040, filed Jan. 29, 1987, a tape winding device in which a magnetic field is applied in the direction of the thickness of the tape.

SUMMARY OF THE INVENTION

The present invention was made in consideration of the above-mentioned circumstances in order to provide both a method and a device for neatly winding a magnetic tape even if the physical properties of the tape are irregular.

Accordingly, it is an object of the present invention to provide a method and a device for neatly winding a magnetic tape, without complicating the device and deteriorating the quality of the tape as in the above-described neat winding systems, so as to improve the properties of the winding process.

It is another object of the present invention to provide a method and a device for winding a magnetic tape so as to greatly improve the wound state of the tape in the in-cassette winding system.

One of the methods is characterized in that a magnetic field having a single direction oblique to the direction of the width of the magnetic tape being wound is applied to the tape while it is wound on a tape winding body. The method is exercised by the corresponding device in which the tape winding body is rotated to wind the magnetic tape and which is characterized in that a magnet which generates the magnetic field is provided at least near the tape winding body.

In the other device, a tape winding body is rotated to wind the magnetic tape. The device is characterized in that a magnet surrounding the axis of rotation of the tape winding body along the form thereof is provided at a member of the tape winding body and generates a magnetic field having almost a single direction oblique to the axis of rotation.

DETAILED DESCRIPTION OF THE PREFERRED EMBODIMENTS

Embodiments of the present invention are hereafter described in detail with reference to the drawings.

Figure 6:
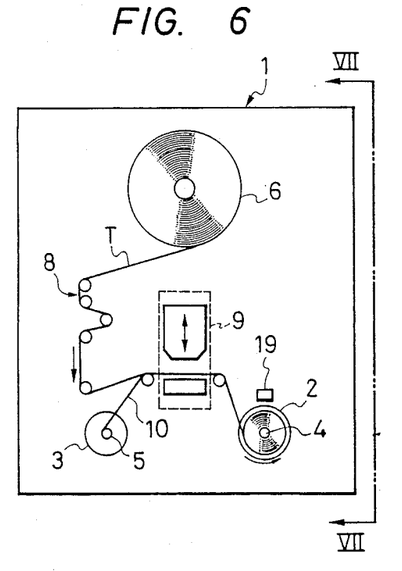
FIG. 6 shows a schematic front view of a winding device which is a first embodiment of the present invention.
Figure 7:
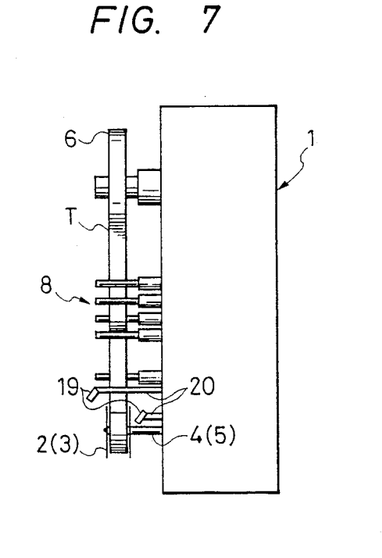
FIG. 7 shows a schematic side view of the device shown in FIG. 6.

FIG. 6 shows a magnetic tape winding device 1 which is the first embodiment of the present invention. FIG. 7 shows a side view of the device 1 seen along line VII—VII shown in FIG. 6.

The tape winding device 1 is used to perform a method in which a magnetic tape T is wound on a pair of tape winding bodies 2 and 3 (which are hereinafter also referred to as tape reels) before the tape and the tape winding bodies are put in a video tape cassette or the like.

The operation of the magnetic tape winding device 1 is described from now on. The tape reels 2 and 3 coupled to each other by a leading tape 10 (only half of which is shown in FIG. 6) having a prescribed length are mounted on shafts 4 and 5, which are rotated. The leading tape 10 is then cut off at almost its central portion. The cut-off end of the leading tape 10 at the take-up tape reel 2 is spliced to the front end of a tape T from a previously-mounted magnetic tape source 6 by a splicing tape or the like. After the magnetic tape T wound by a prescribed length on the take-up tape reel 2 is cut off, the cut-off end of the tape T is spliced to the other cut-off end of the leading tape 10 at the other tape reel 3. The cutting of the leading tape 10 and the magnetic tape T and the splicing of them are performed by a cutoff and splicing means 9 including a tape end holder, a cutter and the splicing tape. The cutoff and splicing means 9 is not shown in FIG. 7.

The magnetic tape T supplied from the tape source 6 is wound on the take-up tape reel 2 through a transport system 8 including guide pins and guide rollers.

The above-described range of the operation is the same as a conventional winding device. The winding device 1 provided in accordance with the present invention is characterized by a mounting portion for the tape reel 2, at which permanent magnets 19 are provided so that they obliquely face each other across the reel 2.

For example, the south pole of the lower permanent magnet 19 (right-hand magnet In FIG. 8) faces the north pole of the upper permanent magnet 19. The mutually facing pole surfaces of the magnets 19 are parallel with each other so that the lines of magnetic forces of the magnets extend straight from the north pole to the south pole. In other words, the direction of the magnetic field between the magnets is oblique at a prescribed angle $\theta$ to the direction of the width of the tape, which is parallel with the axis of rotation of the reel 2. It is preferable that the width $l_1$ of each permanent magnet 19 along the radius of the tape reel 2 is not much smaller than the depth $l_2$ of the wound tape. That is because the directionality of the magnetic field extending through the magnetic tape T can be stabilized nearly throughout the width $l_2$ of the wound magnetic tape by making the width $l_1$ of each permanent magnet 19 large enough.

Figure 8:
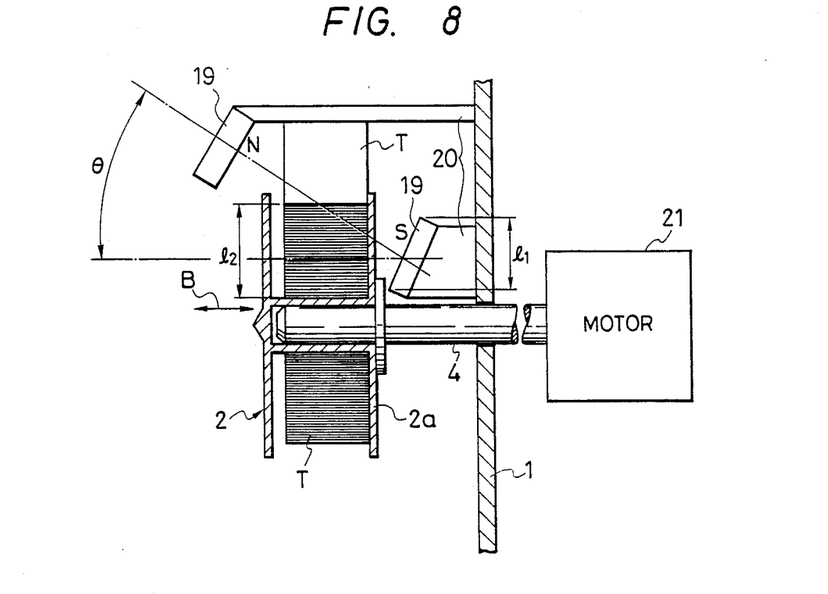
FIG. 8 shows an enlarged sectional view of the main part along the shaft of the device shown in FIG. 7.

The oblique angle $\theta$ and the intensity of the magnetic force of each permanent magnet 19 are not particularly limited. For example, the angle and the intensity can be set depending on various conditions such as the tension of the magnetic tape T at the time of its winding, the kind of the tape, the distance between the tape and each permanent magnet, the speed of the winding (movement of the tape) and the influence of the magnetic field on the tape. If necessary, the magnetic tape may be demagnetized after being wound on the reel 2.

Each of the permanent magnets 19 is supported by a support 20 attached to the winding device 1. The lower permanent magnet 19 nearer the magnetic tape T than the upper permanent magnet 19 has a stronger magnetic force than the upper magnet 19. The upper magnet 19 is provided in such a position as not to be obstructive when the reel 2 is attached and detached to and from the shaft in a direction shown by an arrow B in FIG. 8. The shaft 4 is connected to a drive means 21 such as a motor so as to be rotated thereby.

Figure 10:
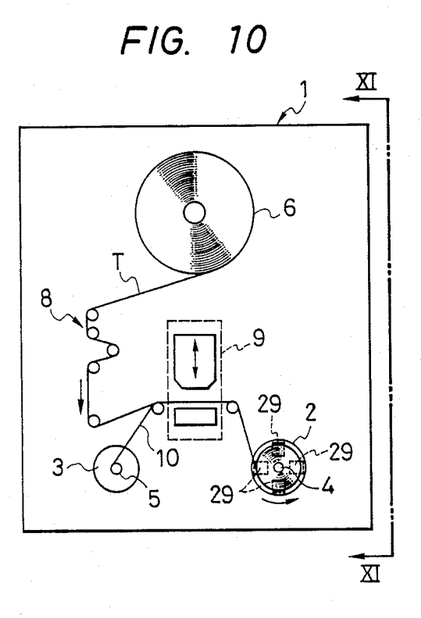
FIG. 10 shows a schematic front view of a winding device which is a second embodiment of the present invention.
Figure 11:
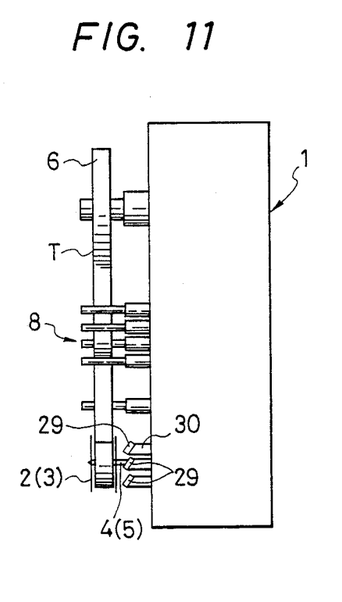
FIG. 11 shows a schematic side view of the device shown in FIG. 10.

FIG. 10 shows a schematic front view of a magnetic tape winding device 1 which is the second embodiment of the present invention. FIG. 11 shows a side view of the device 1 seen along line XI—XI shown in FIG. 10. The same numerals in the drawings denote the same portions.

The second embodiment shown in FIGS. 10 and 11 is characterized by a tape reel mounting portion at which permanent magnets 29 are provided near one side of a tape reel 2 which is for winding a magnetic tape T.

Figure 12:
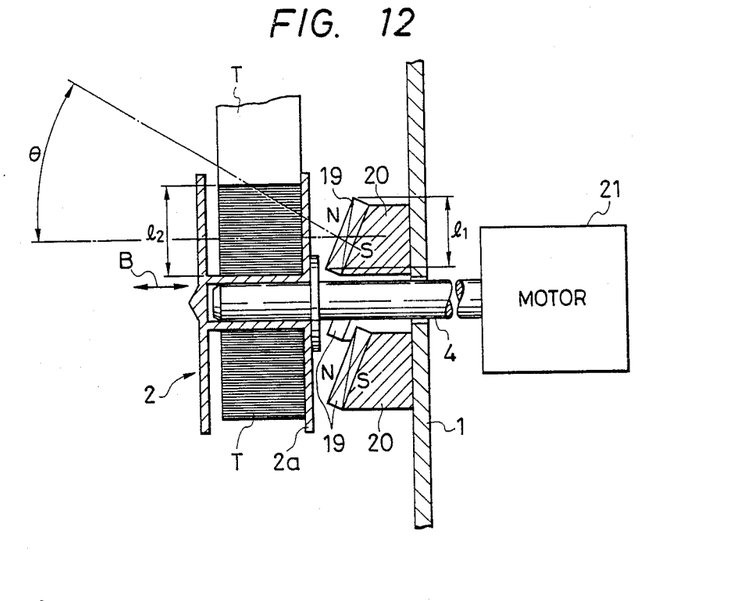
FIG. 12 shows a schematic sectional view of a main part, along the shaft of the device shown in FIG. 11.

As shown in FIG. 12, the north poles of the permanent magnets 29 are located near the flange 2a of the reel 2, and the south poles of the magnets are located opposite the flange 2a. The magnets 29 have the same prescribed oblique angle $\theta$ so that the lines of magnetic force of the magnets 29 extend in nearly the same direction oblique to the direction (along the shaft 4) of the width of the magnetic tape T near the tape reel 2. The number of the permanent magnets 29 is two or more (four in this embodiment). Since the magnets 29 are located on a circle surrounding the shaft 4, the magnetic forces of the magnets uniformly and stably act to the magnetic tape T being wound.

The oblique angle $\theta$ and the intensity of the magnetic force are not particularly limited, as well as in the first embodiment.

When the magnetic tape T is wound on the reel 2 in the first and the second embodiments, the tape is pulled obliquely downward by the magnets 19 and 29 so that one side edge of the tape is brought into contact with the right-hand flange 2a of the reel 2. In addition, a force acts to pull the wound turns of the tape to each other in the direction of the thickness of the tape to increase the frictional force between the wound turns to effectively prevent them from deviating in the direction of the width of the tape. Therefore, the portion of the tape T which is already wound on the reel 2 is kept in a stable state by the magnetic forces of the magnets. In other words, the magnetic tape T coated with a magnetic substance is caused to receive an urging force due to the magnetic field without being in contact with the magnets, so that the magnetic tape does not deviate in the direction of the width thereof. Therefore, the magnetic tape T is very neatly wound on the reel 2.

When the magnetic tape T is wound at a high speed, air is entrapped in between the wound turns of the tape to make an air layer between the wound turns to enable the tape to very lightly move in the direction of the width thereof. For that reason, the side edges of the tape are easily trued up by the magnetic forces of the magnets 19 and 29.

Figure 9:
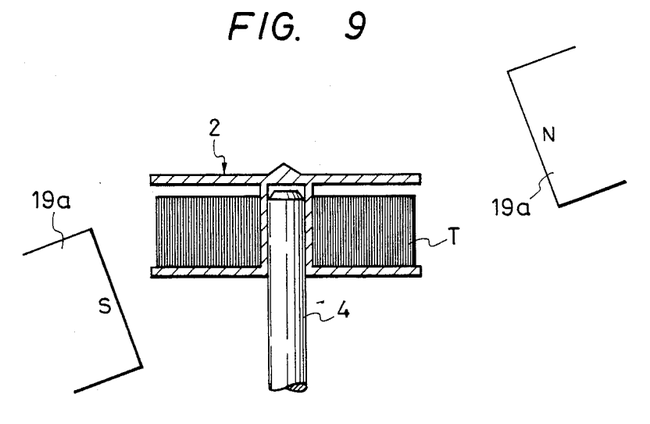
FIG. 9 shows a schematic sectional view of a modification of the first embodiment.

Although the permanent magnets 19 and 29 are secured in prescribed positions in the first and the second embodiments, the present invention is not confined thereto. The magnets may be rendered movable along the axis of the shaft 4 or along the radius of the reel 2. The oblique angle $\theta$ may be rendered variable, in order to optionally change the intensity and direction of the magnetic forces which are applied to the magnetic tape T. For example, in the first embodiment, the permanent magnet 19a may be located in such a manner that the straight lines of the magnetic forces therebetween extend across the shaft 4, as shown in FIG. 9. In that case, the intensity of the magnetic forces of the magnets and the positional relations of the magnets to the magnetic tape T are appropriately set to place the tape on one flange of the reel, as well as the above-described cases.

Although the permanent magnets 19 are provided in such positions as not to hinder the attachment and detachment of the tape reel 2, as shown in FIG. 8, the magnet 19 above the reel does not necessarily need to be secured. For example, the upper magnet 19 may be rendered movable between a tape winding position and a tape nonwinding position so as not to hinder the attachment and detachment of the reel 2.

Figure 13:
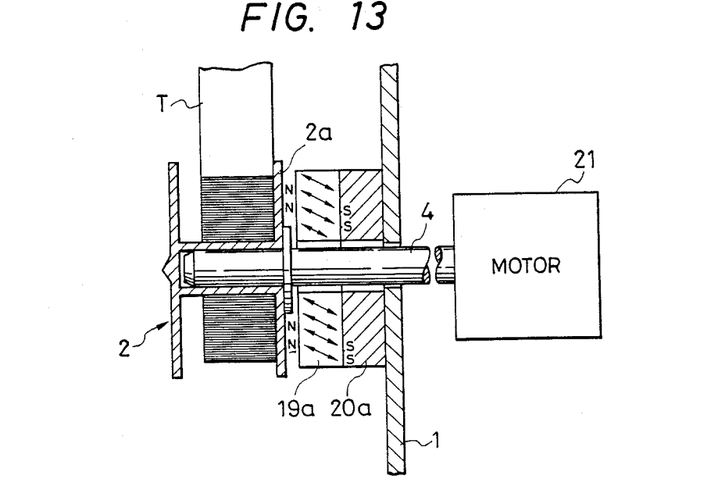
FIG. 13 shows a schematic sectional view of the the main part of a modification of the second embodiment.

Although the plurality of magnets 29 are provided at the same oblique angle on the single circle in the second embodiment, the present invention is not confined to such construction. For example, an annular permanent magnet 29a may be attached by a support 30a, as shown in FIG. 13. The magnet 29a is magnetized in mutually parallel directions oblique to the axis of the shaft 4 extending along the width of the wound tape.

Although the magnets in the above-described embodiments are permanent magnets, they may be electromagnets. The magnetic forces of the electromagnets can be optionally altered by changing the magnitudes of their electrical currents.

Although the magnets in the embodiments are provided only near the tape reel 2, the present invention is not confined thereto. For example, other magnets may be provided in the passage system 8 through which the magnetic tape T is moved. In that case, the magnetic forces of the magnets in the passage system 8 are applied to the tape in the direction of the width thereof to suppress the swing of the tape in that direction to stabilize the movement of the tape.

Although each of the above-described embodiments is made for the open-reel winding system, the present invention can also be applied to another winding system such as the in-cassette winding system.

In addition, the present invention can be applied to a process of winding a magnetic tape which has a larger width than a magnetic tape as a final product. This magnetic tape is to be made into a source tape. The present invention can also be applied to a process of winding a magnetic tape from a cutter which is for making the tape as a source tape.

The present invention can also be applied to a winding device in which a plurality of source tapes each having the same width as a magnetic tape as a final product are wound while a source tape of larger width than the tape as the final product is slit into the plurality of source tapes.

The magnets provided in the above-described embodiments may be substituted by other magnetic field generation means such as a solenoid.

According to the present invention, a magnetic field is applied to a magnetic tape at the time of its winding so that magnetic forces act on the tape at nearly the same oblique angle to the direction of the width of the tape and act on at least almost all of a tape winding body, as described in detail above. For that reason, a force widely and uniformly acts to the magnetic tape in the direction of the width thereof and another force widely and uniformly acts to pull the wound turns of the tape to each other in the direction of the thickness thereof, while the tape is being wound on the tape winding body. As a result, these forces acts at not only on the central portion of the tape winding body but also its peripheral portion. As a result, the winding movement of the tape is greatly stabilized from the beginning of the winding thereof to the end of the winding so that the side edges of the tape are trued up. Therefore, the magnetic tape is very neatly wound.

Since a means for applying the magnetic forces to the magnetic tape to neatly wind it is not in contact with the tape, troubles such as the bend of the tape and the damage to the side edge of the tape or to its magnetic side do not occur from the contact, as occurs in the prior arts. Therefore, the quality of the wound magnetic tape is high.

A magnetic tape winding device provided in accordance with the present invention has advantages that a means for neatly winding a magnetic tape is neither large in size nor complicated in constitution.

It will be understood from the above description that according to the present invention, the quality of the wound magnetic tape and the productivity of the process of winding the tape are enhanced. As for the in-cassette winding system in particular, a greatly advanced device for winding a magnetic tape can be provided in accordance with the present invention.

What is claimed is:

1. A magnetic tape winding method, comprising the steps of:
    winding a magnetic tape onto a tape winding body having a flange; and
    applying a substantially linear magnetic field to said tape wound adjacent said flange in a direction oblique to an axis of rotation of said winding, said magnetic field being substantially constant on said tape independently of a winding depth of said tape on said tape winding body.

2. A magnetic tape winding device, comprising:
    a tape winding body having a flange;
    means for rotating said tape winding body to wind a magnetic tape on said magnetic winding body; and
    magnetic means for applying a substantially linear magnetic field to said tape wound adjacent said flange in a direction oblique to an axis of rotation of said rotating means, said magnetic field being substantially constant on said tape independently of a winding depth of said tape on said tape winding body.

3. A magnetic tape winding device as recited in claim 2, wherein said magnetic means comprises first and second magnetic means disposed on opposite sides of said wound tape and having inverse magnetic poles facing said wound tape.

4. A magnetic tape winding device as recited in claim 3, wherein said first and second magnetic means are first and second magnets.

5. A magnetic tape winding device as recited in claim 4, wherein said first and second magnets are disposed on a same side of an axis of said rotating means.

6. A magnetic tape winding device as recited in claim 4, wherein said first and second magnets are disposed on opposite sides of an axis of said rotating means.

7. A magnetic tape winding device as recited in claim 2, wherein said magnetic means surrounds an axis of rotation of said tape winding body.

8. A magnetic tape winding device as recited in claim 7, wherein said magnetic means comprises an integral magnet on one side of said tape winding body, surrounding said axis of rotation and being substantially linearly magnetized along mutually parallel directions oblique to said axis of rotation.

9. A magnetic tape winding device as recited in claim 7, wherein said magnetic means comprises a plurality of magnets on one side of said tape winding body and producing substantially parallel magnetic fields.

* * * * *